March 10, 1936.     C. LEACH     2,033,432
GAS TANK LOCK
Filed March 29, 1935     2 Sheets-Sheet 1

Inventor
C. Leach
By Clarence A. O'Brien
Attorney

March 10, 1936.   C. LEACH   2,033,432
GAS TANK LOCK
Filed March 29, 1935   2 Sheets-Sheet 2

Inventor
C. Leach

By Clarence A. O'Brien
Attorney

Patented Mar. 10, 1936

2,033,432

UNITED STATES PATENT OFFICE 2,033,432

GAS TANK LOCK

Chillson Leach, Ashland, Ky.

Application March 29, 1935, Serial No. 13,766

1 Claim. (Cl. 220—55)

This invention relates to a lock for a gasoline tank, the general object of the invention being to provide means for preventing access to the tank of an automobile or the like so as to prevent one from stealing the gasoline in the tank, with means whereby the operator or occupant of the automobile can release the lock without leaving the vehicle.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views and in which.

Figure 1:
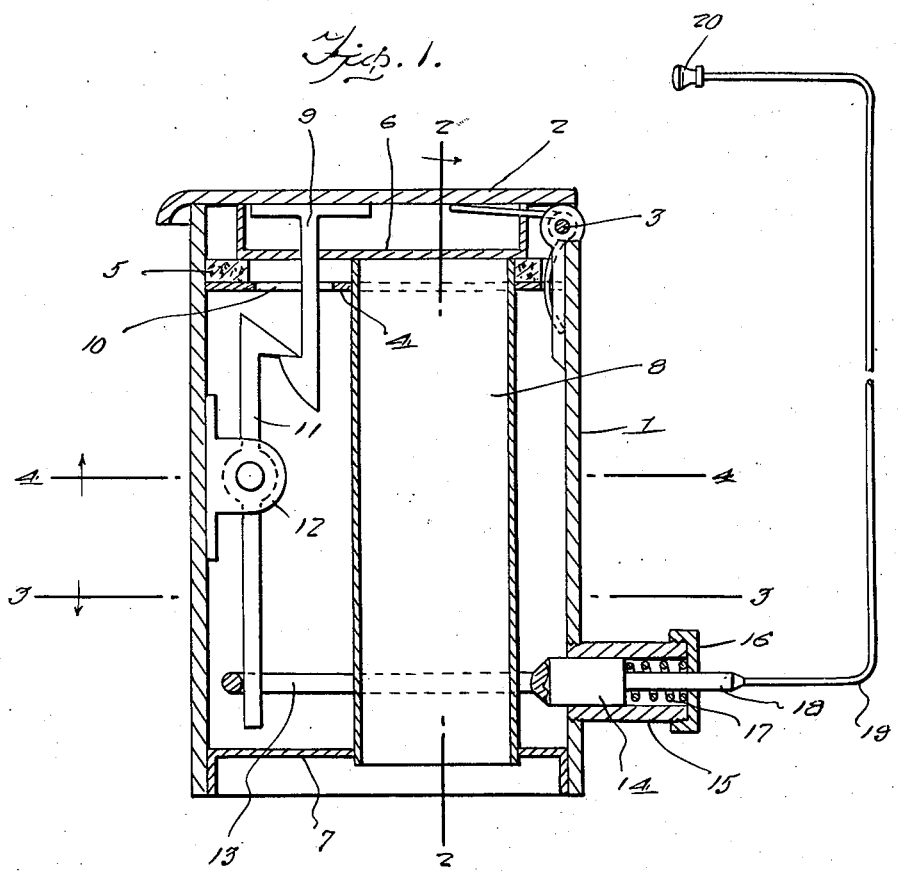
Fig. 1 is a longitudinal sectional view through the neck of a gasoline tank and showing the invention applied thereto.
Figure 3:
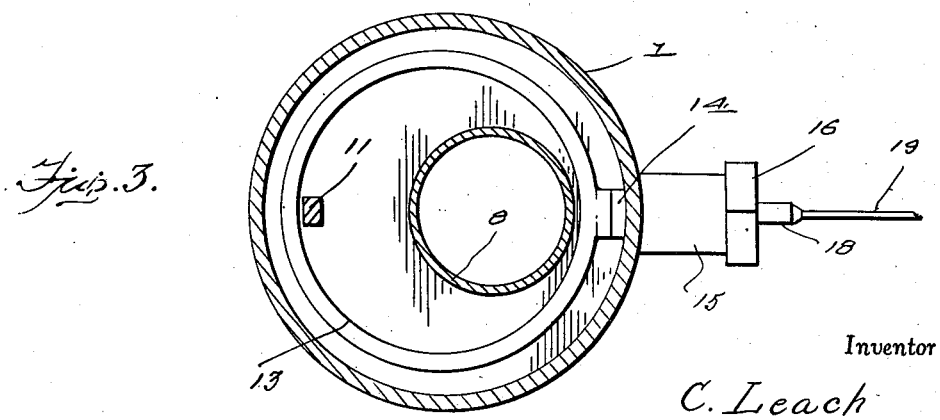
Fig. 3 is a section on line 3—3 of Fig. 1.
Figure 2:
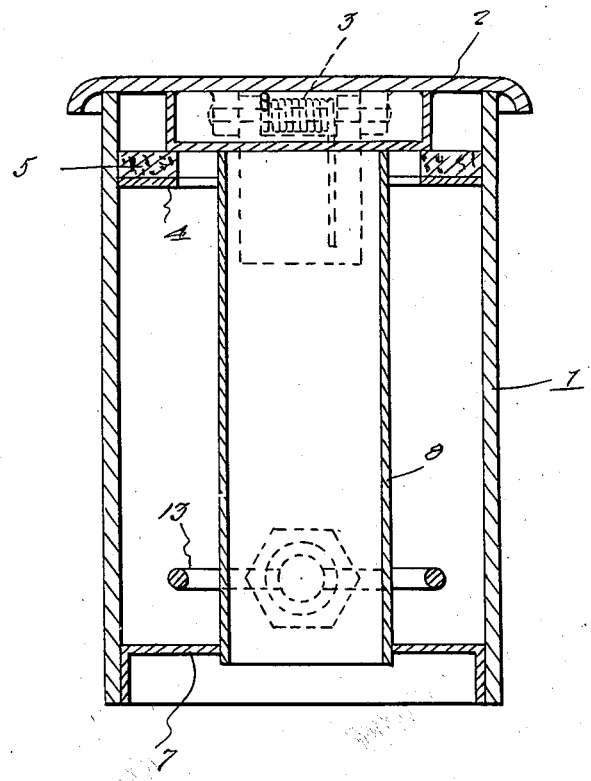
Fig. 2 is a section on line 2—2 of Fig. 1.
Figure 4:
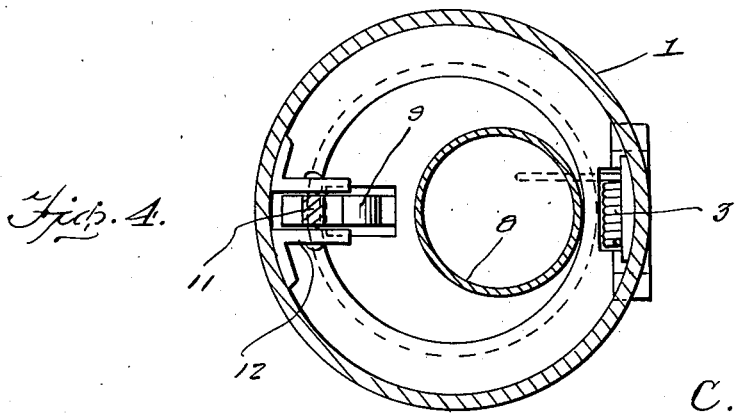
Fig. 4 is a section on line 4—4 of Fig. 1.

In these drawings, the numeral 1 indicates the neck of a gasoline tank of a motor vehicle and the numeral 2 indicates the cover or lid for the neck, the lid being connected with the neck by a spring hinge 3, the spring of which normally holds the lid in closed position. An upper partition 4 extends across the upper part of the neck and supports a gasket 5 which is engaged by a depending cylindrical part attached to the underface of the lid when the lid is in closed position. A lower partition 7 extends across the lower part of the neck and these partitions 4 and 7 support the vertically arranged tube 8 through which the gasoline from the hose of the pump flows into the tank. A stationary latch member 9 is fastened to the underface of the lid and passes through the member 6 and through a hole 10 in the upper partition 4 and depends into the space between the neck and the tube 8. A second latch member 11 is pivotally supported intermediate its ends by the ears 12 attached to the neck, the head of this latch member 11 being adapted to overlap the head of the latch member 9 to hold the lid in closed position as shown in Fig. 1, the parts being so arranged that the two latch members will engage each other when the lid is closed, the beveled edges of the two latch members permitting the heads thereof to pass each other as the lid is being closed. The latch member 11 has its lower part of greater weight than its upper part so that this member 11 is normally held in latching position by the action of gravity so that the upper latch member engages the member 11 and the upper end of the member 11 is forced outwardly and as soon as the heads of the two latch members pass each other the head of the member 11 swings inwardly into engagement with the head of the latch member 9. A ring 13 encircles the lower end of the tube 8 and is located in the lower part of the neck and also engages the lower end of the latch member 11. This ring is carried by a plunger 14 operating in a laterally extending cylinder 15 connected with the lower part of the neck and having its outer end closed by a cover 16. A spring 17 in the cylinder acts to hold the plunger 14 and ring in inoperative position as shown in Fig. 1 with the latch member 11 engaging the latch member 9. However, when the plunger is moved outwardly in the cylinder 15, the ring 13 will exert a pull upon the lower end of the latch member 11, thus rocking the latch member on its pivot and freeing its head from the head of the latch member 9 so that the lid 2 can be lifted. A stem 18 is connected to the plunger 14 and passes through a hole in the cap 16 and a flexible member 19 is connected with the stem and passes to a point adjacent the driver's seat where it is provided with a knob 20 so that by pulling upon the knob, the plunger will be retracted to move the latch member 11 to inoperative position. The flexible member 19 can be placed in a flexible casing and the knob 20 can be associated with any suitable type of lock so that the knob cannot be pulled upon until the lock is moved to open position, thus preventing an unauthorized person from operating the device to release the lid of the gasoline tank in an attempt to secure gasoline from the tank.

It is thought from the foregoing description that the advantages and novel features of the invention will be readily apparent.

It is to be understood that changes may be made in the construction and in the combination and arrangement of the several parts provided that such changes fall within the scope of the appended claim.

I claim:

Anti-thief means for gasoline tanks of motor vehicles and the like comprising a neck for the tank, upper and lower partition members in the neck, a vertically arranged filling tube supported by the partition members with its upper end projecting above the upper partition member, a gasket on the upper partition member, a lid for the neck, a spring hinge connecting the lid to a part of the neck, a depending portion on the lid engaging the gasket when the lid is closed, a depending latch member connected with the underface of the lid, and the upper partition member having a hole therein for the passage of the latch member, a second latch member pivotally arranged in the neck and having a head at its upper end for engaging the head at the lower end of the first mentioned latch member under the action of gravity, a plunger cylinder extending laterally from the lower part of the neck, a plunger in the cylinder, a ring having a part connected with the inner end of the plunger, said ring passing around the tube and the lower end of the second latch member, a spring for projecting the plunger and means for retracting the plunger from a remote point.

CHILLSON LEACH.